Patented July 28, 1936

2,048,728

UNITED STATES PATENT OFFICE 2,048,728

PROCESS FOR MAKING A CLEAR FISH GLUE OR FISH GELATIN SOLUTION

Edward F. Christopher, Chicago, Ill., assignor to Industrial Patents Corporation, Chicago, Ill., a corporation of Delaware No Drawing. Application June 21, 1934,
Serial No. 731,673

4 Claims. (Cl. 87—7)

This invention relates to an improved fish offal glue particularly characterized by its clarity and improved quality derived from its relative freedom from non-adhesive materials.

This invention further relates to a novel process by which the improved fish offal glue of this invention may be produced.

It is an object of this invention to provide a process for clarifying the customary opalescent or opaque solutions of fish offal glue as derived from the customary commercial process of treating fish offal either with or without previous acid treatment.

It is a further object of this invention to provide a process of producing a glue of the above described type which offers the economic advantage of lower cost of production and superior quality by the removal of non-adhesive material from the glue solutions.

Fish offal glue is prepared from fish refuse which may include various parts of the fish carcass including the bones, but particularly the bony structures and the heads of fish.

In preparing fish offal glue, the glue contained in the refuse, particularly in the bones of the fish heads is dissolved and a solution produced which is opalescent or opaque.

It is ordinary practice in preparing fish glue to use the raw stock either fresh or salted. The fresh stock is thoroughly washed and the salted stock washed until the wash water is free from salt. After washing, the stock is placed in a pressure tank and cooked. A small amount of acid to facilitate cooking is sometimes used, it being ordinary practice to use two gallons of acetic acid for each four tons of stock. The stock is cooked under twelve to fifteen pounds of pressure for about two and one-half hours and the dilute glue solution is then drawn off and concentrated in an evaporator to the desired consistency.

The product thus derived is serviceable in many uses, but in other instances it is desirable to obtain a transparent clear fish offal glue.

It has been discovered that the opaque or opalescent appearance of the glue solution is due to the presence of certain non-adhesive materials, the elimination of which not only improves the quality of the glue from the adhesive standpoint, but also renders it clear and transparent, which is important where a clear glue is required and as an enhancement of the marketability of the product.

In United States Patent No. 1,895,446 in which I am the joint inventor, a method is described for producing a clarified bone glue.

I have found that the method described and claimed in said patent is not applicable to hide glue or fish skin glue, for example, nor to casein glue, but I have found that fish offal glue may be clarified in a manner similar to that taught in the said patent for use with bone glue.

As is pointed out in that patent, it is well known that the treatment of glue solutions with an acid such as phosphoric acid or sulphurous acid will cause the alkaline earths present in the solution to precipitate out at a pH of 7.0 or thereabouts. If the acidity of the solution is adjusted to the neighborhood of pH 5.0 or lower, the alkaline earth salts go back into solution. The alkaline earths have the effect of rendering dried glue opaque and, therefore, common practice in the treatment of glue liquors calls for treating the liquor with phosphoric acid or sulphurous acid to adjust the acidity of the liquor to a pH of 7.0 which is most conveniently done in practice by resorting to litmus as the indicator.

It is there shown that the alkaline earths which are thus removed as a precipitate at a pH of 7.0 have no appreciable effect on the transparency or opacity of liquid glue which is the product of that invention, and I have found that the same is true of the glue which is the product of the present invention. However, there are present in all glue liquors, certain little understood organic substances which do not seem to affect the transparency or opacity of dried glue and are, therefore, not a factor for consideration in the manufacture of dried glue, which do adversely affect the transparency of liquid glue.

I have now found that the invention described and claimed in that patent and there specifically limited to bone glue is not operative on hide glue or on fish skin glue, for example, and it is therefore not to be expected that the invention would be operative on fish offal glue, it being well known that glues from various sources do not necessarily react alike in the presence of various reagents and are, therefore, in no sense equivalents.

I have found that the substances which cause opacity in liquid fish offal glue may be removed without the removal of the alkaline earths by adjusting the acidity of the fish offal glue solution to a pH of 5.0 or lower, at which degree of acidity, determined in practice by the use of methyl red as an indicator, the organic substances which tend to cloud the liquid glue flocculate out and any alkaline earths which have commenced precipitation go back into solution since these substances are soluble at the degree of acidity indicated by a pH of 5.0 or lower.

Accordingly, this invention is directed to a process by which the non-adhesive materials are removed and the glue is rendered transparent and clear and of better adhesive quality, and also to the glue product resulting therefrom.

It has been found that the non-adhesive materials may be removed by treating the fish offal glue solution prepared as above described, with acids or acid reacting salts, or acid reacting or producing substances, of such character and in such quantity that the acidity of the fish offal glue solution is adjusted to a pH of substantially 5.0 or lower.

As a matter of example, it is found that hydrochloric, sulphuric, nitric, phosphoric, tartaric, oxalic, or sulphurous acids serve well in this use, but other acids or acid reacting salts, or acid reacting or producing substances, or mixtures of any of the above named substances, may be used. For instance, it has been found that hydrogen peroxide may be substituted for any of the above named acids for the production of the same results. The reason for this is not clearly understood, but it is considered that hydrogen peroxide, which is a strong oxidizing agent, acts in the presence of the glue, which is an amphoteric substance, to produce a pH of approximately 5.0 or lower.

After the pH is adjusted to approximately 5.0 or lower, flocculation takes place, and the flocculated material may then be separated from the remaining clear liquid by any suitable method, such as draining off the clear liquid, centrifuging the solution, or by any other means known to those skilled in the art for removing suspended materials from liquids.

Thereafter the clear fish offal glue or gelatine solution may be concentrated, and if desired, dried. It is found that the dried product when dissolved in water, again produces a transparent clear solution. I have discovered that ordinary solutions of fish offal glue not treated in accordance with this clarifying process, even though filtered as dilute solutions, will become opaque when concentrated.

The clarifying process here described produces a thinner or less viscous glue than the corresponding unclarified glue when both have the same setting point. This fact makes for advantage for several reasons; first, at equal viscosities more glue solids can be applied to objects and consequently the time required for the glue to set and for the water to evaporate is decreased, thereby effecting a saving in power in cases where evaporation is hastened mechanically; and secondly, the thinner glue permits one to spread it at a lower temperature, and therefore, it possesses a greater working temperature range than the unclarified glue.

In the claims the term glue is used in a broad sense and includes the relatively pure substances ordinarily termed gelatin as well as the relatively impure or degraded substances ordinarily termed glue.

I claim:

1. The process of producing a transparent clear fish offal glue solution, which consists in treating ordinary fish offal glue solutions with acids, acid reacting salts, acid producing substances or mixtures thereof, so that the acidity of the glue solution is adjusted to substantially a pH of 5.0 or lower, at which degree of acidity the alkaline earths are not substantially affected, and light scattering organic material present in colloidal suspension flocculates out and thereafter removing the flocculated material formed.

2. A process which comprises treating ordinary fish offal glue solutions with an acid substance sufficient to adjust the solution to a pH of substantially 5.0 or lower at which degree of acidity the alkaline earths are not substantially affected, and light scattering organic material present in colloidal suspension flocculates out.

3. As an article of manufacture, fish offal glue characterized by the presence of the alkaline earths normally present in fish offal glue from which light scattering organic material has been removed by flocculation by an adjustment of acidity of a pH of 5.0 or lower.

4. As an article of manufacture, a fish offal glue solution prepared by treating ordinary fish offal glue solutions with acids, acid reacting salts, acid producing substances or mixtures thereof so that the acidity of the glue solution is adjusted to substantially a pH of 5.0 or lower and characterized by the presence of the alkaline earths normally present in fish offal glue and the substantial absence of light scattering organic material normally present in colloidal suspension in fish offal glue.

EDWARD F. CHRISTOPHER.